US008107423B2

(12) United States Patent
Hung (10) Patent No.: US 8,107,423 B2
(45) Date of Patent: Jan. 31, 2012

(54) REAL-TIME POSITIONING SYSTEM, METHOD THEREFOR, AND DEVICE CONTAINING COMPUTER SOFTWARE

(75) Inventor: Pai-Fu Hung, Tainan (TW)

(73) Assignee: Institute for Information Industry, Taipei (TW)

( * ) Notice: Subject to any disclaimer, the term of this patent is extended or adjusted under 35 U.S.C. 154(b) by 612 days.

(21) Appl. No.: 12/344,967

(22) Filed: Dec. 29, 2008

(65) Prior Publication Data

US 2010/0142439 A1   Jun. 10, 2010

(30) Foreign Application Priority Data

Dec. 10, 2008   (TW) .............................. 97148014 A (51) Int. Cl.
*H04W 64/00*   (2009.01)
(52) U.S. Cl. ........ 370/328; 370/338; 370/334; 370/336; 370/252; 455/562.1
(58) Field of Classification Search .................. 370/328, 370/338, 334, 336, 401; 455/562.1
See application file for complete search history.

(56) References Cited

U.S. PATENT DOCUMENTS

| | | | |
|---|---|---|---|
| 5,194,871 A * | 3/1993 | Counselman, III | 342/357.26 |
| 6,445,688 B1 * | 9/2002 | Garces et al. | 370/334 |
| 7,123,940 B1 * | 10/2006 | Rausch et al. | 455/562.1 |
| 7,587,173 B2 * | 9/2009 | Hoffmann et al. | 455/63.4 |
| 2003/0214914 A1 * | 11/2003 | Cain | 370/252 |
| 2004/0106436 A1 * | 6/2004 | Ochi et al. | 455/562.1 |
| 2006/0040670 A1 * | 2/2006 | Li et al. | 455/445 |

* cited by examiner

*Primary Examiner* — Ricky Ngo
*Assistant Examiner* — Rasheed Gidado
(74) *Attorney, Agent, or Firm* — Morris Manning & Martin LLP; Tim Tingkang Xia, Esq.

(57) ABSTRACT

A real-time positioning system, a real-time positioning method, and a device containing computer software are provided. The system includes a coordinator and at least one router. The coordinator carries out a signal interconnection with each router of a first layer via an omni-directional antenna, and calculates an initial distance according to the strength of the signal interconnection. Then, the coordinator carries out a signal interconnection with the router via a plurality of directional antennas respectively to analyze an initial direction of the router of the first layer according to the strength of the signal interconnection with each of the directional antennas and corrects the initial direction according to the slope angle of the coordinator, so as to position the router of the first layer according to the initial distance and the initial direction. Each router positions each router of the next layer in the same manner as the coordinator.

36 Claims, 10 Drawing Sheets

REAL-TIME POSITIONING SYSTEM, METHOD THEREFOR, AND DEVICE CONTAINING COMPUTER SOFTWARE

CROSS-REFERENCE TO RELATED PATENT APPLICATION

This application claims the benefit of Taiwan Patent Application No. 097148014, filed on Dec. 10, 2008, which is hereby incorporated by reference for all purposes as if fully set forth herein.

BACKGROUND OF THE INVENTION

1. Field of Invention

The present invention relates to a real-time positioning system, in particular to a real-time positioning system applied in any open or closed spaces.

2. Related Art

In the prior art, most of the currently available wireless positioning systems are formed by combining a control device and a plurality of wireless gateways or wireless routers (wireless routers are illustrated below as an example), so as to locate a mobile device carried by a user in a valid space.

Such wireless positioning system allocates the plurality of wireless routers in a valid space, and the signal detecting ranges of neighboring wireless routers overlap partially to avoid a blind area in the detecting ranges, in which the wireless routers employ omni-directional antennas to send detecting signals. When the user equipped with the mobile device enters the valid space, a signal interconnection motion occurs with some of the wireless routers. Each wireless router analyzes the strength of the signal interconnection with the mobile device (such as received signal strength indicator (RSSI), or link quality indication (LQI)), calculates a substantial distance of the mobile device corresponding to each wireless router, and transmits the substantial distance back to the control device. The control device analyzes the location of the mobile device in the valid space according to the substantial distances and the locations of the wireless routers that transmit the substantial distances back, thereby positioning the location of the user.

However, there are other problems to be solved, i.e., when an emergency occurs or tasks with great danger are carried out such as fire, poison gas leakage, radiant ray leakage, mining, or carrying out chemical reactions utilizing chemical tanks in buildings and sites of houses, plant, company, and administration, if these buildings and sites are not allocated with the wireless positioning systems in advance, the rescue personnel can merely determine the rescuing and escaping paths by themselves according to blueprints of the sites, or the memory of the passed passages, thereby making the rescuing and escaping tasks more difficult.

SUMMARY OF THE INVENTION

Accordingly, the present invention is directed to a real-time positioning system, which is adapted to rapidly establish a path traveled by a user in an unknown valid space by means of positioning wireless routers allocated therein.

To solve the above problems of the system, the technical means of the present invention lies in providing a real-time positioning system, which includes a coordinator and a plurality of routers. The coordinator includes a first processor, an omni-directional antenna, a first slope sensing module and a plurality of first directional antennas. The first slope sensing module detects a first slope angle of the coordinator. Each router includes a second processor, a second omni-directional antenna, a second slope sensing module and a plurality of directional antennas. The second slope sensing module detects a second slope angle of the router, The coordinator carries out a signal interconnection with the second omni-directional antennas of the routers of a first layer through the first omni-directional antenna, and the first processor analyzes strength of the signal interconnection to calculate an initial distance of the coordinator towards the routers of the first layer. The coordinator carries out the signal interconnection with the second omni-directional antennas of the routers of the first layer through the first directional antennas again, the first processor analyzes the strength of the signal interconnection carried out by each first directional antenna to analyze an initial direction of the coordinator towards the routers of the first layer and corrects the initial direction according to the first slope angle. The first processor positions the routers of the first layer according to the correcting initial direction and the initial distance.

Each router carries out a signal interconnection with second omni-directional antennas of routers of a next layer through the second omni-directional antenna thereof, and the second processor analyzes the strength of the signal interconnection to calculate a routing distance of the router towards the routers of the next layer. The router carries out the signal interconnection with the second omni-directional antennas of the routers of the next layer through the second directional antennas thereof again, the second processor analyzes the strength of the signal interconnection carried out by each second directional antenna to analyze a routing direction of the router towards the routers of the next layer and corrects the routing direction according to the second slope angle. The second processor positions the routers of the next layer according to the routing direction and the correcting routing distance.

The coordinator and the routers broadcast the positioning results layer by layer after completing the positioning, so as to substantially update positioning tables of the coordinator and each router synchronously.

The present invention further provides a device containing computer software, which is loaded into an electronic device for executing the above real-time positioning manner and achieve the same effect.

The efficacies achieved by the present invention are listed as follows.

Firstly, the coordinator and each router can position rapidly the routers of the next layer, so as to record the traveling path of the user in the space rapidly.

Secondly, the coordinator and each router record the traveling path of the user in the space rapidly, so as to position the unknown space, which is quite suitable for various dangerous working spaces, for example, tasks with great danger such as mining, firefighting, etc.

Thirdly, the system of the present invention is suitable for positioning the personnel through using the portable mobile device carried along by the user, in which the router can position the mobile device by way of positioning the routers of the next layer, and broadcast the positioning results layer by layer, so as to inform the coordinator about the location of the mobile device. Furthermore, the positioning results can be transferred to the mobile device, so that the mobile device displays the positioning of each router and the coordinator.

Fourth, the positioning tables of the coordinator and each router are substantially updated synchronously, so as to avoid the loss of data transferred to each other.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

To make the objectives, constructions, and features of the present invention more comprehensible, the present invention is described below in detail through relevant embodiments and drawings.

Figure 1:
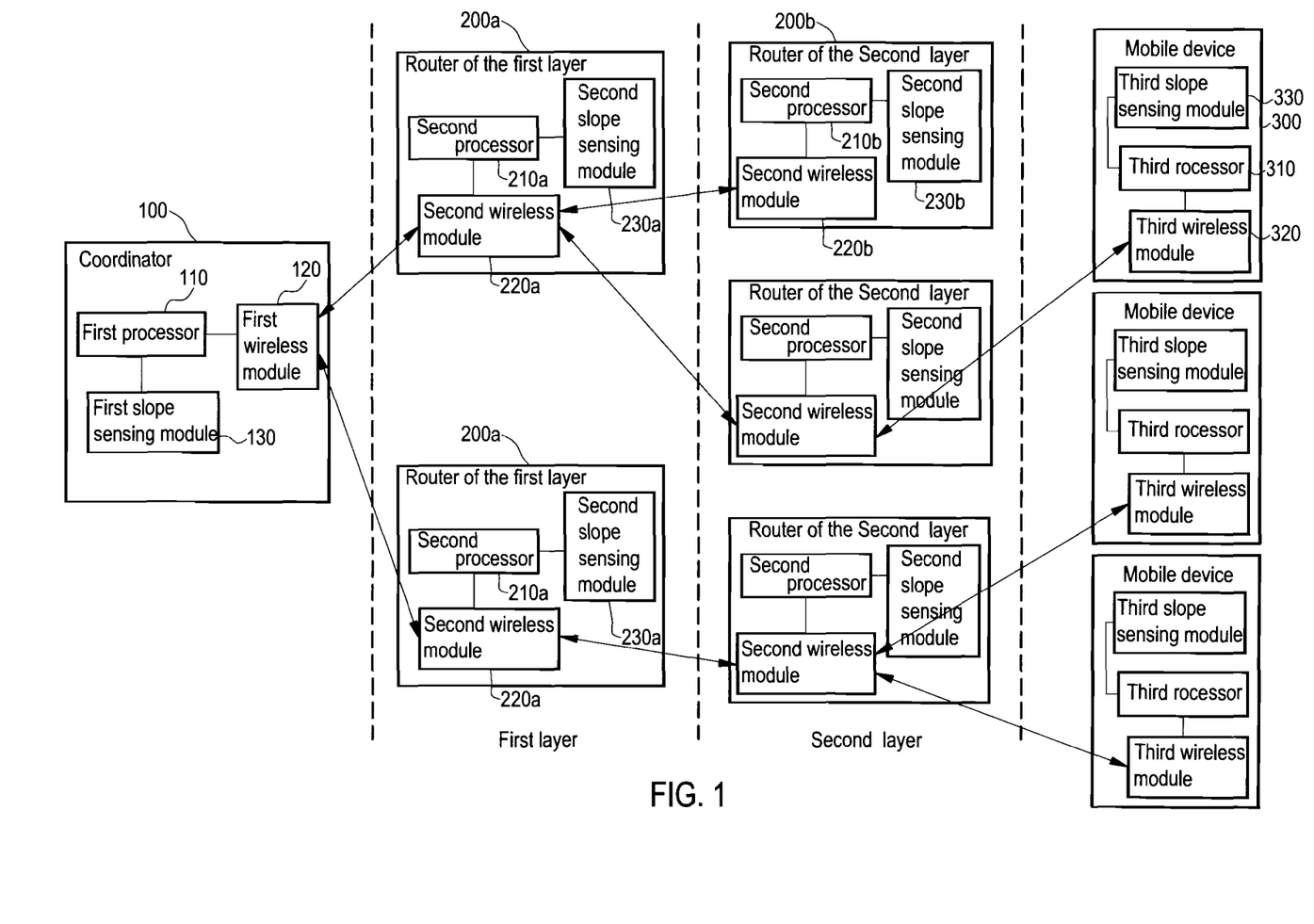
FIG. 1 is a schematic view of a system architecture according to an embodiment of the present invention.
Figure 2:
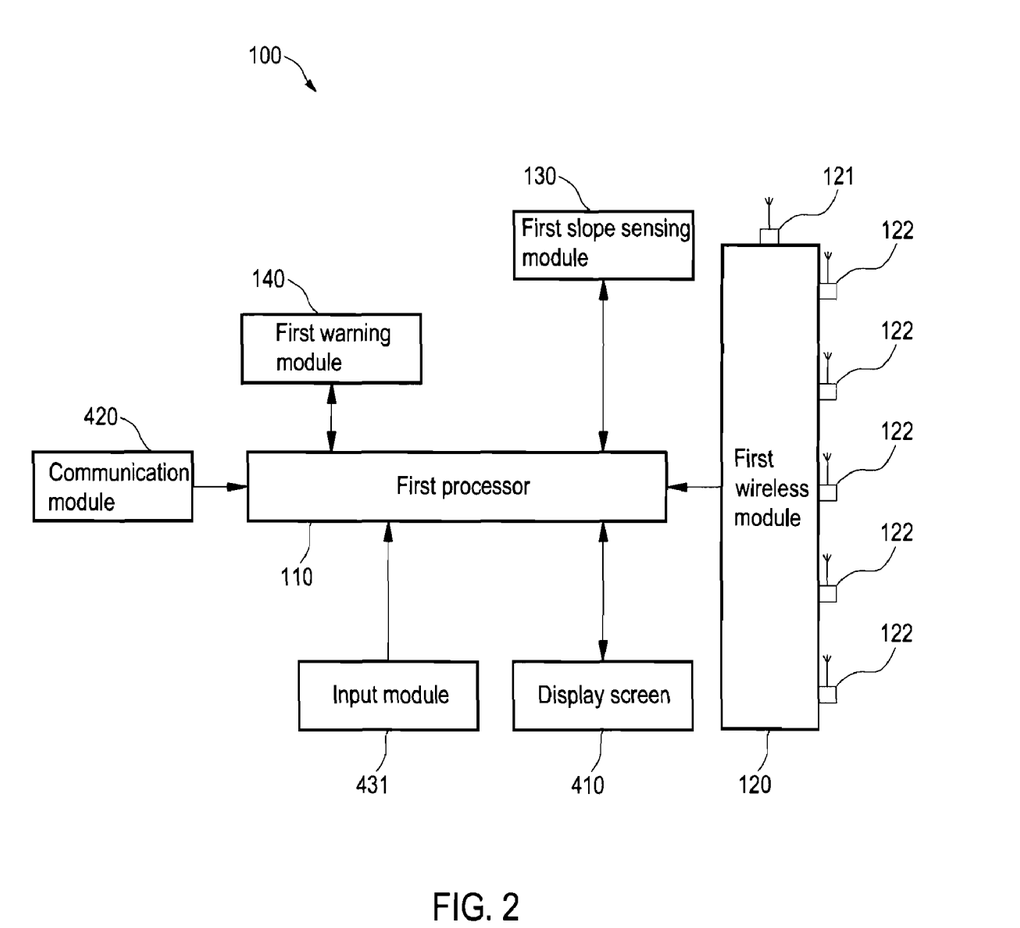
FIG. 2 is a structural diagram of a coordinator according to an embodiment of the present invention.
Figure 3:
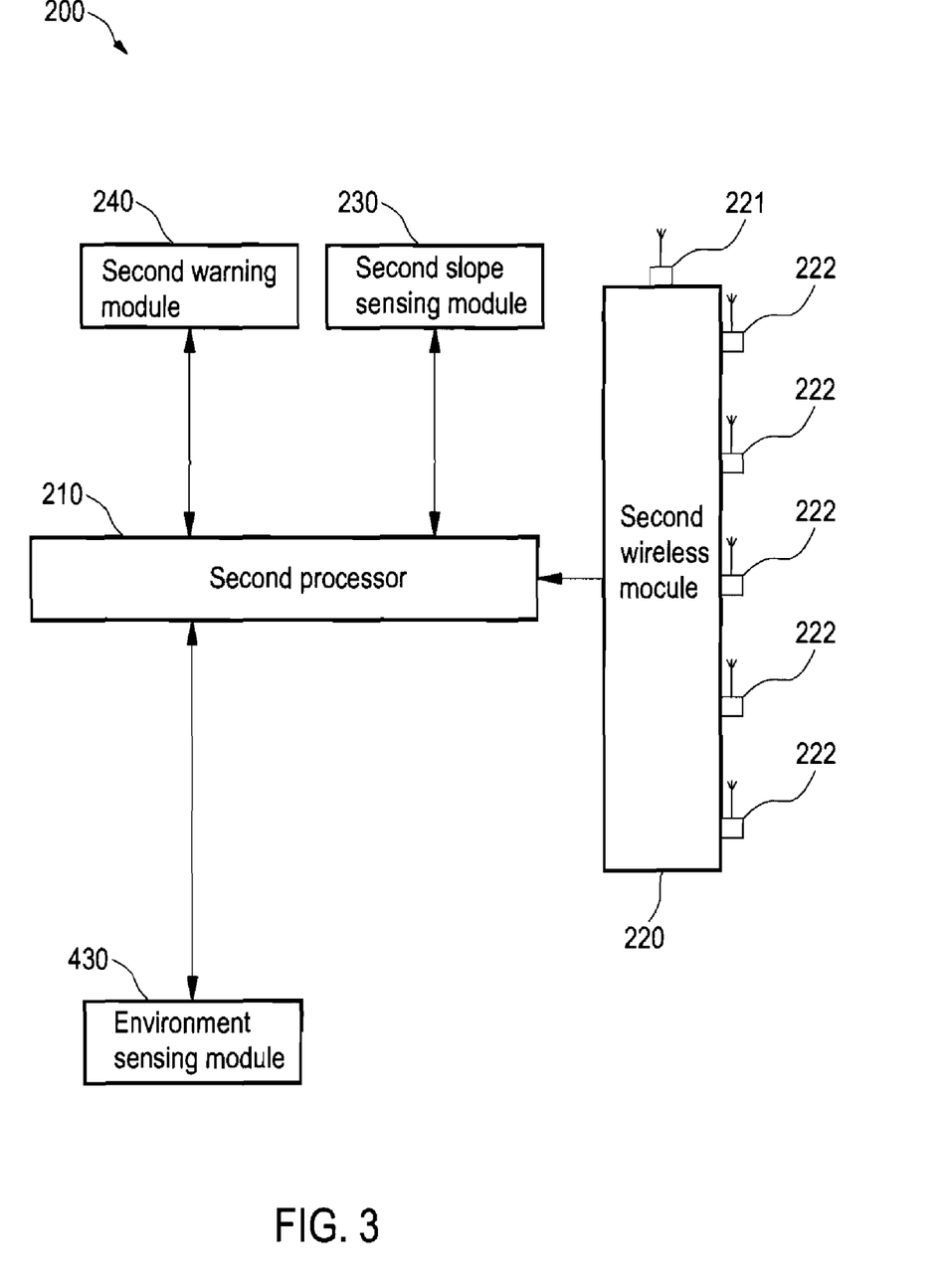
FIG. 3 is a schematic view of a router according to an embodiment of the present invention.

Referring to FIGS. 1, 2 and 3, FIG. 1 is a block diagram of a system according to an embodiment of the present invention. A real-time positioning system includes a coordinator 100 and a plurality of routers 200.

The coordinator 100 includes a first processor 110, a first wireless module 120, and a first slope sensing module 130. The first wireless module 120 includes a first omni-directional antenna 121 and a plurality of first directional antennas 122.

Each router 200 includes a second processor 210, a second wireless module 220, and a second slope sensing module 230. The second wireless module 220 includes a second omni-directional antenna 221 and a plurality of second directional antennas 222.

A detecting angle of the first omni-directional antenna 121 is in a form of spherical coordinates, and a union set of detecting angles of all the first directional antennas 122 substantially equals to the detecting angle of the first omni-directional antenna 121. Similarly, the detecting angle of the second omni-directional antenna 221 is in a form of spherical coordinates, and a union set of the detecting angles of all the second directional antennas 222 substantially equals to the detecting angle of the second omni-directional antenna 221.

Referring to FIG. 1, the first wireless module 120 of the coordinator 100 detects whether the router 200 exists or not via the first omni-directional antenna 121. The routers 200 detected by the coordinator 100 are considered as routers 200a of a first layer. Upon being activated, each router 200a of the first layer responds a response signal back to the first wireless module 120 to form a signal interconnection via the second omni-directional antenna 221a of the second wireless module 220a. The first processor 110 analyzes the strength (such as Received Signal Strength Indicator (RSSI) value) of the signal interconnection between the coordinator 100 and the router 200a of the first layer, and converts the strength to calculate an initial distance between the coordinator 100 and the router 200a of the first layer.

The first wireless module 120 carries out a signal interconnection with the second wireless modules 220a of the routers 200a of the first layer individually via each of the first directional antennas 122. The first processor 110 analyzes the strength of the signal interconnection with each of the first directional antennas 122, finds out the first directional antenna 122 that receives the strongest signal, and there must be routers 200a of the first layer existing within the detecting angle of the above first directional antenna 122, and thus, the first processor 110 analyzes an initial direction of the coordinator 100 towards the routers 200a of the first layer. The first slope sensing module 130 senses a first slope angle of the coordinator 100 itself, and the first processor 110 corrects the initial direction according to the first slope angle. The first processor 110 positions the routers 200a of the first layer according to the correcting initial direction and the initial distance.

Each router 200 positions the routers 200 of the next layer. In this embodiment, the router 200a of the first layer is illustrated to position the routers 200b of the second layer.

Referring to FIG. 1, the second wireless module 220a of the router 200a of the first layer detects whether the router 200 or other devices exists via the second omni-directional antenna 221a. Upon being activated, each router 200b of the second layer responds a response signal back to the second wireless module 220a via the second omni-directional antenna 221b of the second wireless module 220b, so as to form a signal interconnection. The second processor 210a analyzes the strength (such as RSSI value) of the signal interconnection between the router 200a of the first layer and the router 200b of the second layer, and calculates a routing distance between the router 200a of the first layer and the router 200b of the second layer according to the strength.

The second wireless module 220a carries out a signal interconnection with the second wireless modules 220b individually via all the second directional antennas 222a. The second processor 210a analyzes the strength of the signal interconnection with each of the second directional antennas 222a, finds out the second directional antenna 222a that receives the strongest signal, and there must be routers 200b of the second layer existing within the detecting angle of the above second directional antenna 222a. Thus, the second processor 210 analyzes a routing direction of the router 200a of the first layer towards the routers 200b of the second layer. The second slope sensing module 230a senses a second slope angle of the router 200a of the first layer itself, and meanwhile, the second processor 210a corrects the routing direction according to the second slope angle, and positions the routers 200b of the second layer according to the routing direction and the routing distance. An open path without obstacles is required between the neighboring routers 200.

Figure 4:
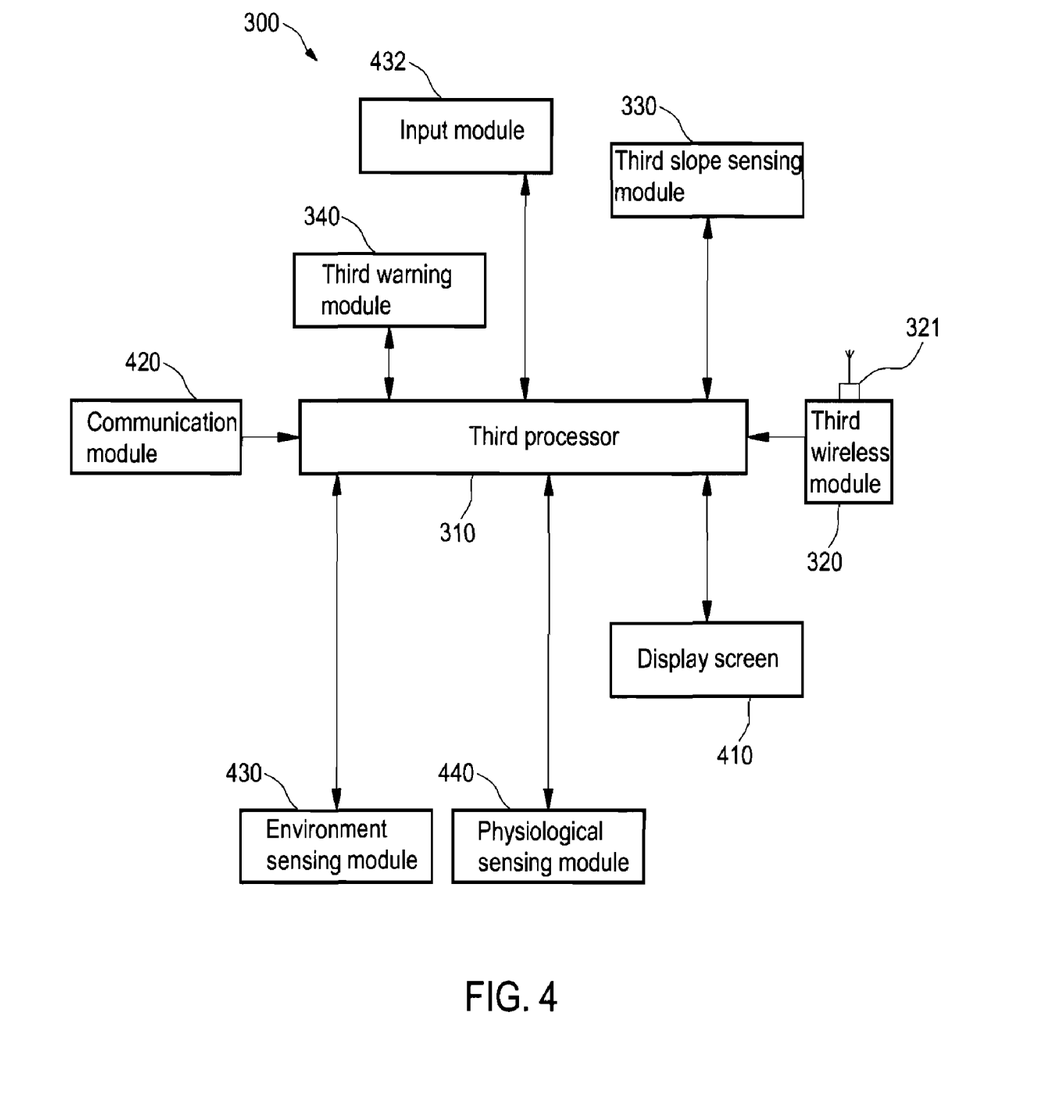
FIG. 4 is a schematic view of a mobile device according to an embodiment of the present invention.

In FIG. 1, the real-time positioning system further includes more than one mobile device 300, which are allocated in a cap worn at the head of the user. In FIG. 4, a mobile device 300 includes a third wireless module 320 and a display screen 410, in which the third wireless module 320 is capable of transmitting and receiving wireless signals and has a third omni-directional antenna 321.

All the routers 200 and the coordinator 100 can detect the presence of the mobile devices 300, and in this embodiment, the router 200b of the second layer is illustrated for detecting the mobile devices 300.

The second wireless module 220b of the router 200b of the second layer detects whether the router 200 or other devices exists in its detecting range via the second omni-directional antenna 221b. The third wireless module 320 of each mobile device 300 responds a response signal back to the second wireless module 220b via the third omni-directional antenna 321, so as to form the signal interconnection. The second processor 210b analyzes the strength (such as RSSI value) of the signal interconnection between the router 200b of the second layer and the mobile device 300, and converts the strength to calculate the spacing between the router 200b of the second layer and the mobile device 300.

The second wireless module 220b carries out a signal interconnection with the third wireless module 320 of each mobile device 300 individually via all the second directional antennas 222b. The second processor 210b analyzes the strength of the signal interconnection with each second directional antenna 222b, finds out the second directional antenna 222b that receives the strongest signal, and there must be mobile devices 300 existing within the detecting angle of the above second directional antenna 222b. Thus, the second processor 210b of the router 200b of the second layer analyzes a direction of the router 200b of the second layer towards the mobile device 300. The second slope sensing module 230b senses a slope angle of the router 200b of the second layer itself, and meanwhile the second processor 210b of the router 200b of the second layer corrects the direction obtained previously according to the slope angle. The second processor 210b positions the mobile device 300 according to the correcting direction and the spacing.

The coordinator 100 and the routers 200 of each layer broadcast the positioning results layer by layer immediately when any of them finishes the positioning of the routers 200 of the next layer, so that positioning tables individually stored by the coordinator 100, the routers 200 of each layer, and the mobile devices 300 are updated synchronously. That is to say, contents of the positioning tables stored by the coordinator 100, the routers 200 of each layer, and the mobile devices 300 are consistent with each other.

The display screen 410 of the mobile device 300 is provided for displaying the positioning tables, and showing schematic views of the positioning circumstances of each router 200, the coordinator 100, and another mobile device 300.

When the router 200 is displaced due to certain external factors, the second slope sensing module 230 of the router 200 detects that the slope angle of the router 200 is changed. After the changes of the slope angle are terminated, the second processor 210 repositions the routers 200 of the next layer.

Referring to FIGS. 2, 3 and 4, the coordinator 100 further includes a first warning module 140, a communication module 420, a display screen 410 and an input module 431. Each router 200 further includes a second warning module 240 and at least one environment sensing module 430. Each mobile device 300 further includes a third warning module 340, at least one environment sensing module 430, at least one physiological sensing module 440, a third slope sensing module 330 and a input module 432.

The third slope sensing module 330 senses a slope angle of the mobile device 300. When a third processor 310 of the mobile device 300 determines that the slope angle of the mobile device 300 exceeds a threshold angle for a continuous time period, it is extremely possible that the user of the mobile device 300 has fainted down to the ground. The third processor 310 outputs a warning signal via the third wireless module 320. Such warning signal is transmitted to other mobile devices 300 and the coordinator 100 via each router 200, and then the warning signal is issued by the first warning module 140 or the third warning module 340, so as to inform the user of the coordinator 100 or each mobile device 300 to take rescuing measures.

Furthermore, when the second processor 210 determines that the router 200 itself cannot be connected to other devices, a connection interrupt signal is issued via the second warning module 240. The operations of the first processor 110 and the third processor 310 are similar to that described above, which are not described in detail here.

Furthermore, each router 200 and the mobile device 300 are allocated with the same type of environment sensing module 430, which is used to sense the information about the environment around each router 200 and the mobile device 300 and transmit the information to each mobile device 300 and the coordinator 100, and thus, the user of the coordinator 100 and each mobile device 300 is enabled to get to know the environment changes of each space area.

The physiological sensing module 440 detects physiological information of the user of the mobile device 300 continuously. Once the third processor 310 analyzes that the physiological information becomes abnormal, a warning signal is output through the third wireless module 320, and the warning signal is transmitted to each mobile device 300 and the coordinator 100 via each router 200.

The user of the coordinator 100 and each mobile device 300 can make a conversation with the communication module 420 of the mobile device 300 through the communication module 420 of the coordinator 100, and the conversation data is transmitted by the second wireless module 220 of each router 200.

However, the input module 431 of the coordinator 100 is used to provide the user to input a control command in order to start or switch the function of the coordinator 100 and switch the appearance of the display screen 410. The input module 432 of the mobile devices 300 is used to provide the user to input a control command in order to start or switch the function of the mobile devices 300 and switch the appearance of the display screen 410

Figure 5A:
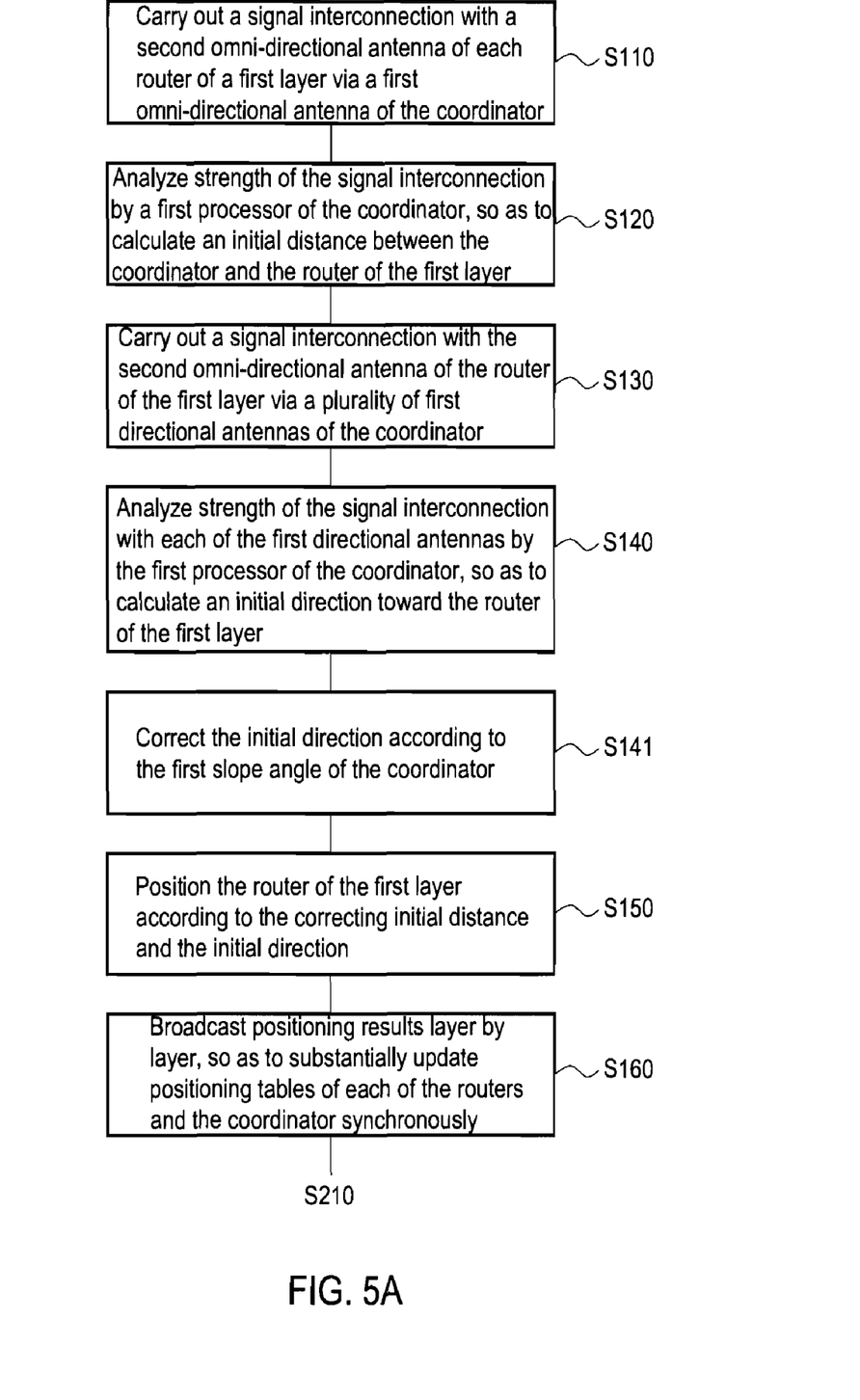
FIG. 5A is a flow chart for positioning the router of the first layer according to an embodiment of the present invention.

FIG. 5A is a flow chart for positioning the router 200a of the first layer according to an embodiment of the present invention, referring to FIGS. 1, 2 and 3 for better understanding.

First, the coordinator 100 carries out a signal interconnection with the second omni-directional antenna 221 of each router 200a of the first layer via the first omni-directional antenna 121 thereof (Step S110).

After the coordinator 100 has been started, it uses the first slope sensing module 130 to detect the slope angle of the coordinator 100, and a first slope angle is obtained after the slope angle stops changing.

The first wireless module 120 of the coordinator 100 detects the router 200 via the first omni-directional antenna 121. At a proper location in a space, the user presses a positioning key on the router 200a of the first layer to activate the router 200a of the first layer. The router 200a of the first layer utilizes the second slope sensing module 230a to detect and obtain a slope angle of the router 200a of the first layer. After the slope angle maintains unchanged, the second slope sensing module 230a obtains a second slope angle to the second processor 210a. The second wireless module 220a carries out a signal interconnection motion via the second omni-directional antenna 221a and the first wireless module 120.

Next, the first processor 110 of the coordinator 100 analyzes the strength of the signal interconnection to calculate an initial distance between the coordinator 100 and the router 200a of the first layer (Step S120).

Then, the coordinator 100 carries out a signal interconnection with the second omni-directional antenna 221a of the router 200a of the first layer via the plurality of first directional antennas 122 thereof (Step S130). The coordinator 100 carries out a signal interconnection with the second omni-directional antenna 221a of the router 200a of the first layer respectively via each of the first directional antennas 122 in sequence, and each first directional antenna 122 is used at least once.

Then, the first processor 110 of the coordinator 100 analyzes the strength of the signal interconnection with each of the first directional antennas 122 to calculate an initial direction toward the router 200a of the first layer (Step S140). As described above, the first processor 110 finds out the first directional antenna 122 that receives the strongest signal, analyzes an initial direction of the coordinator 100 towards the router 200a of the first layer from the detecting angle thereof, and utilizes the first slope angle to correct the initial direction (Step S141). The first processor 110 positions the router 200a of the first layer according to the correcting initial distance and the initial direction (Step S150), and broadcasts the positioning results layer by layer, so as to substantially update the positioning tables stored in each router 200 and the coordinator 100 synchronously (Step S160).

The coordinator 100 maintains the signal interconnection with the second omni-directional antenna 221a of the router 200a of the first layer via the first omni-directional antenna 121.

Figure 5B:
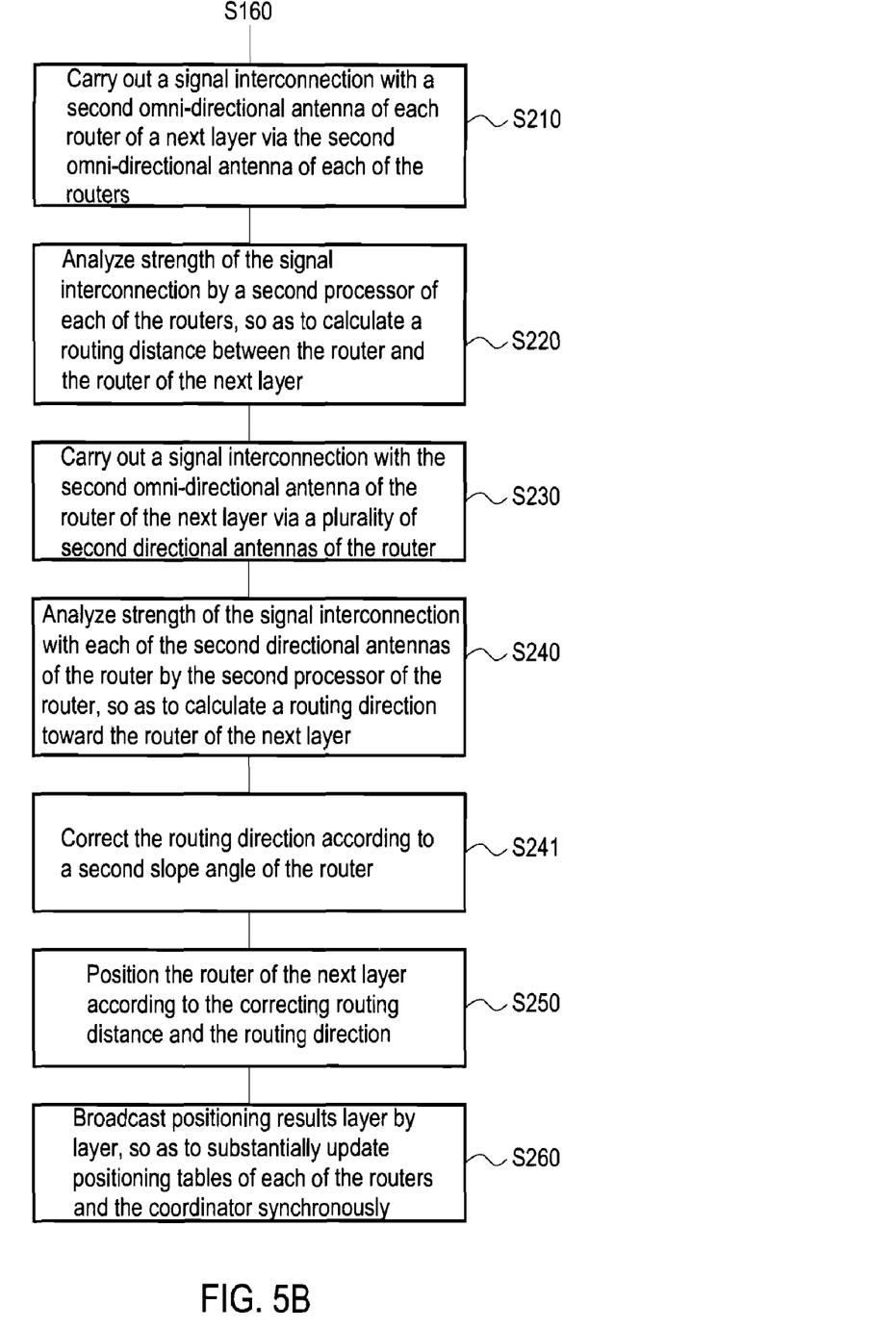
FIG. 5B is a flow chart for positioning a router according to an embodiment of the present invention.

FIG. 5B is a flow chart for positioning a router 200 according to an embodiment of the present invention, referring to FIGS. 1, 2, and 3 for better understanding.

First, each router 200 carries out a signal interconnection with the second omni-directional antenna 221b of each router 200 of the next layer via the second omni-directional antenna 221a thereof (Step S210). The router 200a of the first layer is illustrated below for positioning each router 200b of the second layer.

At a proper location in a space, the user presses a positioning key on the router 200b of the second layer to activate the router 200b of the second layer. The router 200b of the second layer utilizes the second slope sensing module 230 thereof to detect and obtain the second slope angle of the router 200b of the second layer. Once the slope angle maintains unchanged, the second processor 210b obtains the ultimate slope angle and carries out a signal interconnection motion between the second omni-directional antenna 221 of the second wireless module 220b and the first omni-directional antenna 121.

Next, the second processor 210 of each router 200 analyzes the strength of the signal interconnection to calculate a routing distance between each router 200 and the router 200 of the next layer (Step S220). For example, the router 200a of the first layer utilize the second processor 210a to analyzes the strength of the signal interconnection with the router of the first layer 200a and the router of the second layer 200b, so as to calculate a routing distance between the router of the first layer 200a and the router of the second layer 200b.

Then, the router 200 carries out a signal interconnection with the second omni-directional antenna 221 of the router 200 of the next layer via the plurality of second directional antennas 222 thereof (Step S230). The router 200a of the first layer carries out the signal interconnection with the second omni-directional antenna 221b of the router 200b of the second layer respectively via all the second directional antennas 222a thereof in sequence, and each of the second directional antennas 222a is used at least once.

Then, the second processor 210 of the router 200 analyzes the strength of the signal interconnection with each of the second directional antennas 222 to calculate a routing direction of the router 200 of the next layer (Step S240). As described above, the second processor 210a of the router 200a of the first layer finds out the second directional antenna 222a that receives the strongest signal, analyzes a routing direction toward the second router of the second layer 200b from the router of the first layer 200a, and utilizes the second slope angle to correct the routing direction (Step S241).

Then, the second processor of the router positions the router of the next layer according to the correcting routing distance and the routing direction (Step S250). Therefore, the second processor 210a positions the router 200b of the second layer according to the correcting routing distance and the routing direction, and broadcasts the positioning results layer by layer, so that the positioning tables stored in each router 200 and the coordinator 100 is substantially updated synchronously (Step S260).

The router 200a of the first layer maintains the signal interconnection with the second omni-directional antenna 221b of the router 200b of the second layer via the omni-directional antenna 221a thereof.

Figure 6A:
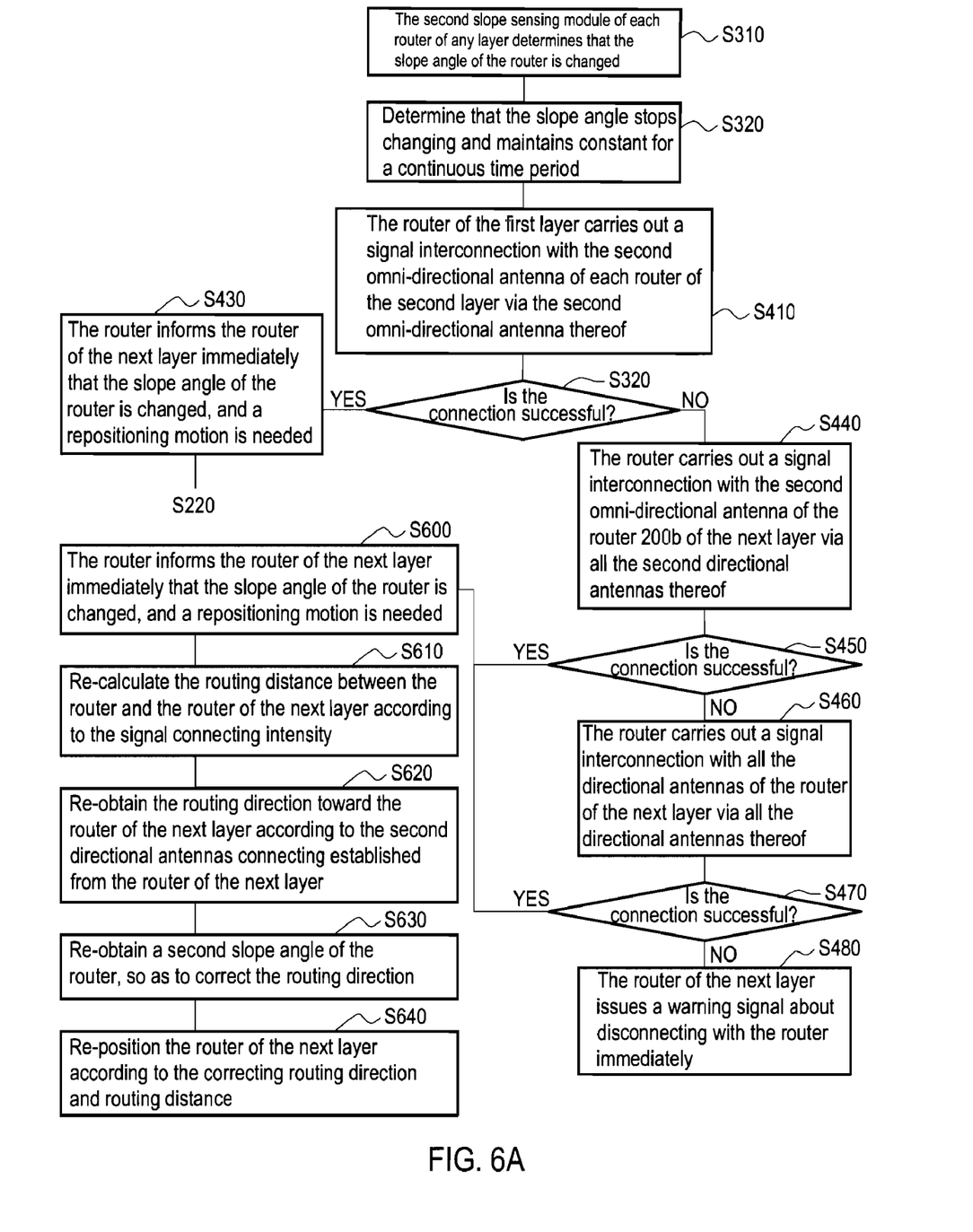
FIG. 6A is flow chart for repositioning the router of the next layer according to an embodiment of the present invention.
Figure 6B:
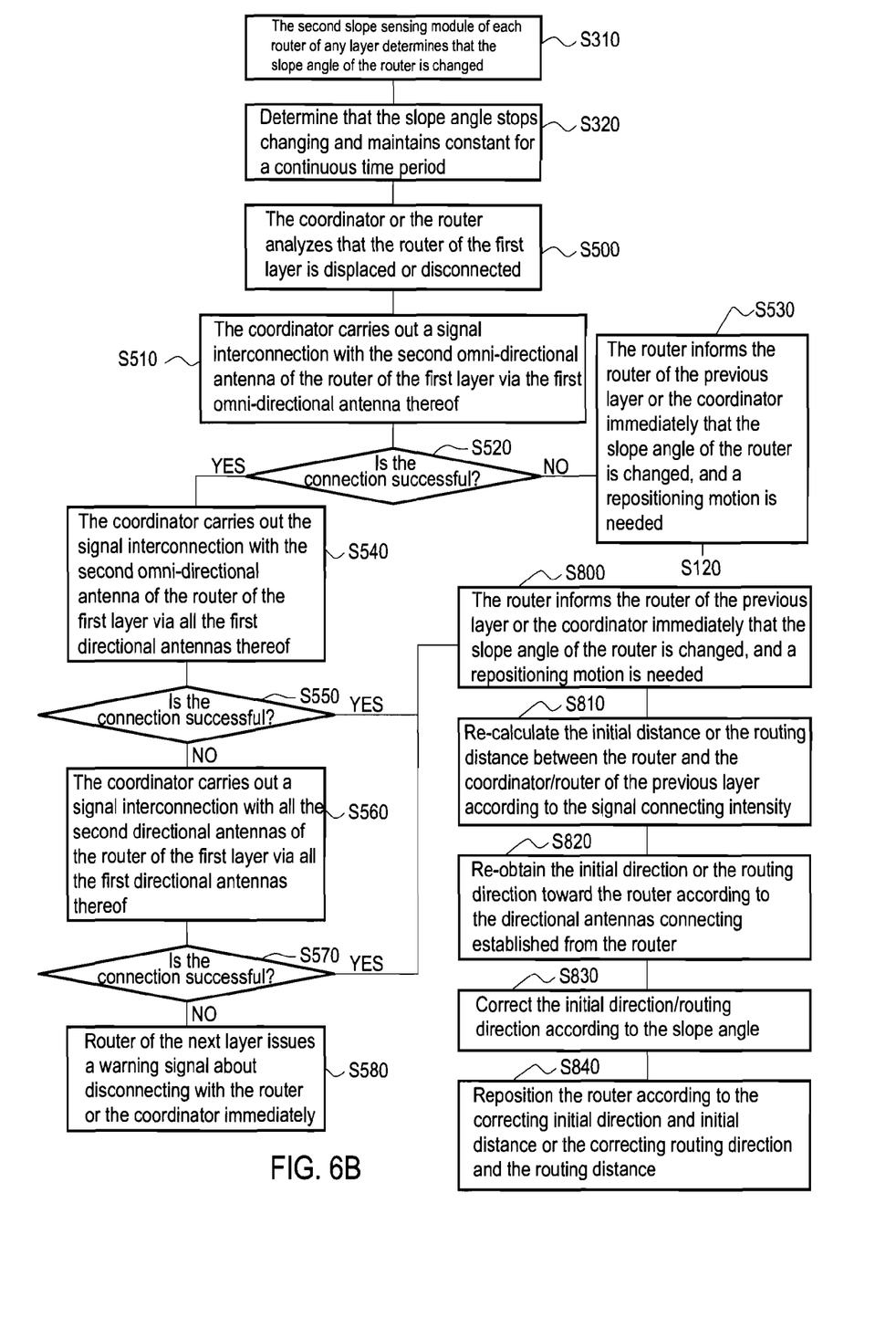
FIG. 6B is flow chart for repositioning the router of the next layer according to an embodiment of the present invention.

FIGS. 6A and 6B are flow charts for repositioning the router 200 of the next layer according to an embodiment of the present invention, which are applied to the coordinator 100 for repositioning the routers 200a of the first layer, and applied to the router 200 of each layer for repositioning the routers 200 of the next layer.

The second slope sensing module 230 of each router 200 of any layer determines that the slope angle of the router 200 is changed (Step S310), and the router 200 is displaced due to external factors. The second slope sensing module 230 determines that the slope angle stops changing and maintains constant for a continuous time period (Step S320), and the router 200 that is displaced attempts to re-establish a connection with a device of a previous layer and the router 200 of the next layer, in which the device of the previous layer may be the routers 200 or the coordinator 100, and the repositioning process is quite similar. Illustration is made below with the router 200a of the firs layer as the router 200 that is displaced.

The router 200a of the first layer carries out a signal interconnection with the second omni-directional antenna 221b of each router 200b of the second layer via the second omni-directional antenna 221a thereof (Step S410).

Once the connection is successfully reestablished (Step S420), the router 200a of the first layer informs the router 200b of the second layer immediately that the slope angle of the router 200a of the first layer is changed, and a repositioning motion is needed (Step S430). Steps S220 to S260 are performed again to reposition the router 200b of the second layer.

When it fails to reestablish the connection via the omni-directional antenna (Step S420), the router 200a of the first layer carries out a signal interconnection with the second omni-directional antenna 221b of the router 200b of the second layer via all the second directional antennas 222a thereof (Step S440).

Once the connection is successfully reestablished (Step S450), the router of the first layer 200a informs the router of the second layer 200b immediately that the slope angle of the router of the first layer 200a is changed, and a repositioning motion is needed (Step S600). The second processor 210a re-calculate the routing distance between the router of the first layer 200a and the router of the second layer 200b according to signal connecting intensity (Step S610). The second processor 210a obtains a routing direction toward the router of the second layer 200b according to the second directional antennas 222a connecting established from the router of the second layer 200b (Step S620). The second slope sensing module 230 of the router of the first layer 200a re-obtain a second slope angle of the router of the first layer 200a, and the second processor 210a correct the routing direction according to the second slope angle (Step S630), and repositions the router 200b of the second layer according to the correcting routing direction and routing distance (Step S640).

When it fails to reestablish the connection (Step S450), the router 200a of the first layer carries out a signal interconnection with all the directional antennas 222b of the router 200b of the second layer via all the directional antennas 222a thereof (Step S460), and the router 200a of the first layer and the router 200b of the second layer switch their respective directional antenna continuously, or attempt to establish the signal interconnection via the previous directional antenna.

Once the connection is successfully reestablished (Step S470), the router 200a of the first layer performs Step S600 to S640 again to reposition the router 200b of the second layer. Once it fails to reestablish the connection (Step S470), the router 200b of the second layer issues a warning signal about disconnecting with the router 200a of the first layer immediately (Step S480). Meanwhile, when the router 200a of the first layer is disconnected with the router 200b of the second layer for a long time, the router 200a of the first layer attempts to position the router (if any) of the third layer and takes the router of the third layer to replace the router 200b of the second layer.

If the router 200 that is displaced is in a layer below the second layer, the repositioning flow thereof is quite similar, which is not described here in detail.

Furthermore, regardless of the coordinator 100 or each router 200, it periodically detects whether the routers 200 of the next layer exist or not. For example, the coordinator 100 detects the presence of the routers 200a of the first layer, and the router 200a of the first layer detects the presence of the routers 200b of the second layer, and so on.

Therefore, in this embodiment, the router 200a of the first layer attempts to reestablish a connection with the coordinator 100. On the contrary, the coordinator 100 also analyzes that the router 200a of the first layer is displaced or disconnected according to the changes of the strength of the signal or the circumstance of disconnecting the router 200a of the first layer (Step S500).

The coordinator 100 carries out a signal interconnection with the second omni-directional antenna 221a of the router 200a of the first layer via the first omni-directional antenna 121 thereof (Step S510).

Once the connection is successfully reestablished via the omni-directional antennas (Step S520), the router 200a of the first layer informs the coordinator 100 immediately that the slope angle of the router 200a of the first layer is changed, and a repositioning motion is needed (Step S530). The coordinator 100 performs Steps S120 to S160 again to reposition the router 200a of the first layer.

Once it fails to reestablish the connection via the omni-directional antennas (Step S520), the coordinator 100 carries out the signal interconnection with the second omni-directional antenna 221a of the router 200a of the first layer via all the first directional antennas 122 thereof (Step S540).

Once the connection is successfully reestablished (Step S550), the router of the first layer 200a informs the coordinator 100 immediately that the slope angle of the router of the first layer 200a is changed, and a repositioning motion is needed (Step S800). The first processor 110 re-calculates the initial distance between the coordinator 100 and the router of the first layer 200a (Step S810). The first processor 110 obtains an initial direction toward the router of the first layer 200a according to the first directional antennas 122 connecting established from the router of the first layer 200a (Step S820). The first slope sensing module 130 of the router of the coordinator 100 re-obtain a first slope angle of the coordinator 100, and the first processor 110 corrects the initial direction according to the first slope angle (Step S830). and repositions the router 200a of the first layer according to the correcting initial direction and initial distance (Step S840)

Once it fails to reestablish the connection (Step S550), the coordinator 100 carries out a signal interconnection with all the second directional antennas 222 of the router 200a of the first layer via all the first directional antennas 122 thereof (Step S560).

Once the connection is successfully reestablished (Step S570), the router 200a of the first layer performs Step S800 again, and meanwhile, the coordinator 100 performs Steps S810 to S840 again to reposition the router 200a of the first layer.

Once it fails to reestablish the connection (Step S570), the router 200a of the first layer issues a warning signal immediately about disconnecting with the coordinator 100 (Step S580). The coordinator 100 attempts to position the router 200b (if any) of the second layer, and takes the router 200b (if any) of the second layer to replace the router 200a of the first layer when disconnecting with the router 200a of the first layer for a long time.

When any of the connections described above is successfully established and the router 200 that is displaced is the router 200b of the second layer, the router 200b of the second layer performs Step S530 or Step S800, and the router 200a of the first layer performs Steps S220 to S260 again or Steps S810 to S840 to reposition the router 200b of the second layer. The repositioning mode of the routers 200 of the subsequent layers is quite similar, which is not described here in detail.

Figure 7:
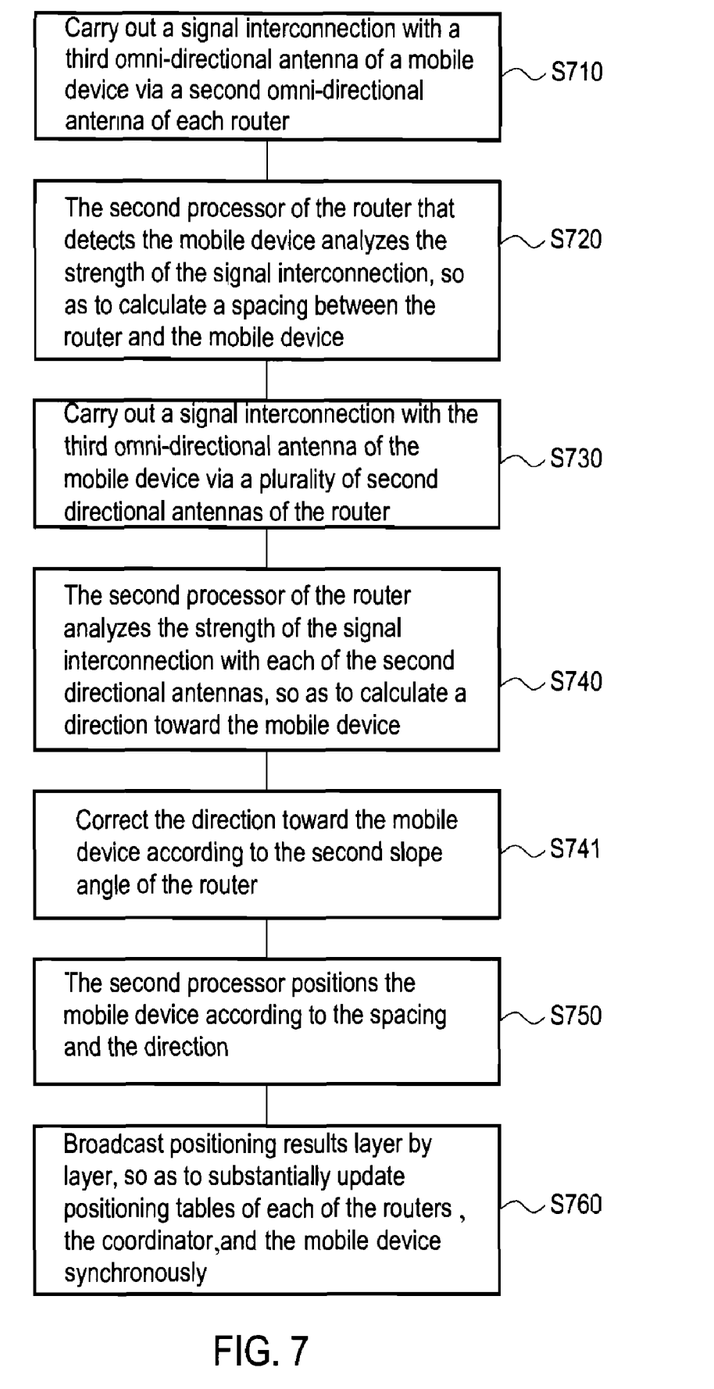
FIG. 7 is a flow chart for positioning mobile devices according to an embodiment of the present invention.

FIG. 7 is a flow chart for positioning mobile devices 300 according to an embodiment of the present invention, referring to FIGS. 1, 3 and 4 for better understanding.

The second omni-directional antenna 221 of each router 200 carries out a signal interconnection with the third omni-directional antenna 321 of at least one mobile device 300 (Step S710). The second processor 210 of the router 200 that finds out the mobile device 300 analyzes the strength of the signal interconnection to calculate a spacing between the router 200 and the mobile device 300 (Step S720). The plurality of second directional antennas 222 of the router 200 carries out a signal interconnection with the second omni-directional antenna 221 of the mobile device 300 (Step S730). The second processor 210 of the router 200 analyzes the strength of the signal interconnection with each directional antenna 222 to calculate a direction of the mobile device 300 (Step S740). The second processor 210 finds out the second directional antenna 222 that has the highest strength of the signal interconnection, and the mobile device 300 exists within a detecting area of the second directional antenna 222 that has the highest strength of the signal interconnection. Then, the second processor 210 corrects the angle information of the direction of the router 200 towards the mobile device 300 according to a slope angle of the router 200 itself (Step S741). The second processor 210 positions the mobile device 300 according to the spacing and the direction (Step S750), and broadcasts the positioning results layer by layer, so as to substantially update the positioning tables stored in each router 200, the coordinator 100, and the mobile device 300 synchronously (Step S760). However, the coordinator 100 may position the mobile device 300 in the same manner as positioning the router 200a of the first layer, which is not described here in detail.

Figure 8:
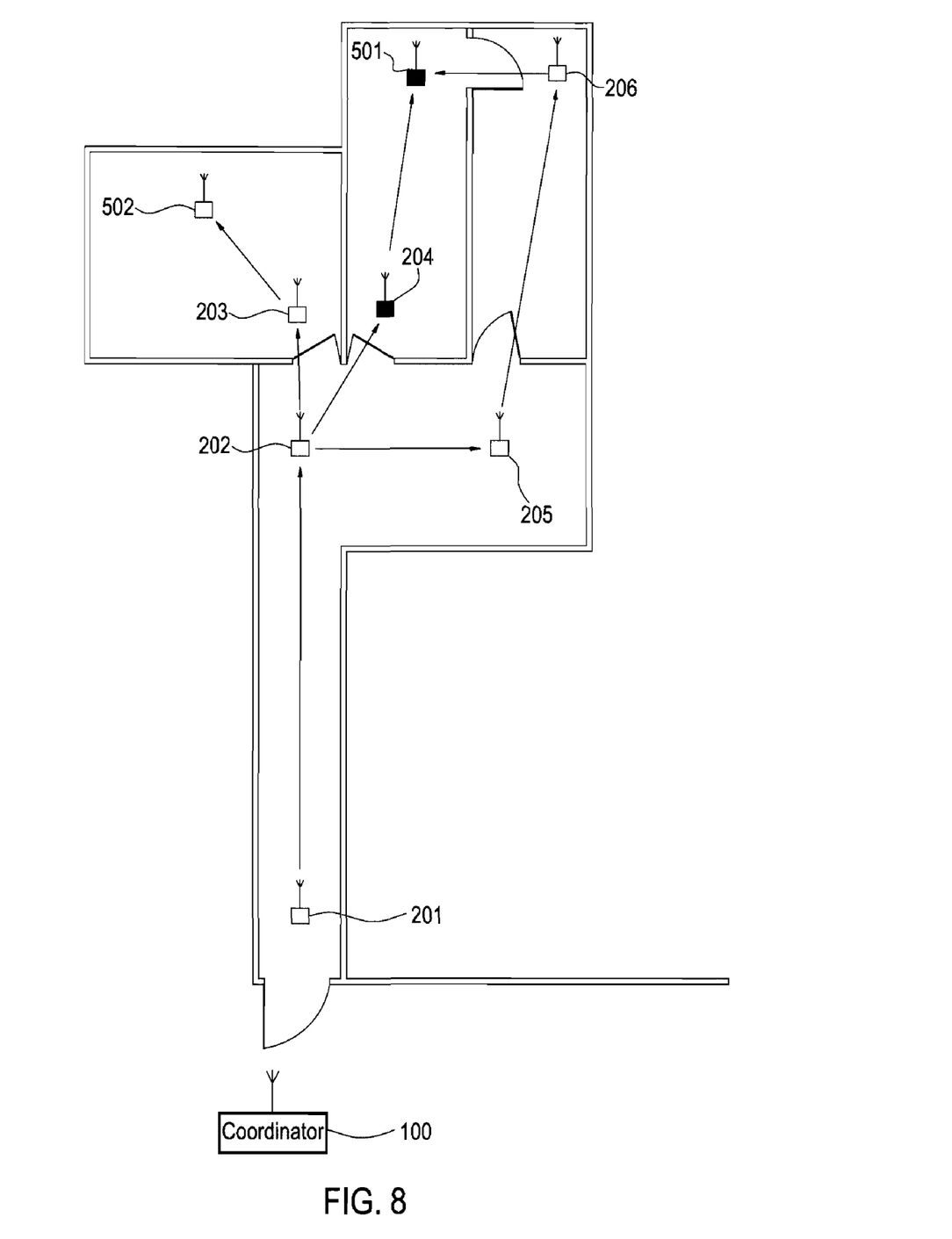
FIG. 8 is a schematic view of a positioning situation of a system according to an embodiment of the present invention.

FIG. 8 is a schematic view of a positioning situation of a system according to an embodiment of the present invention. Taking firefighting as an example, the coordinator 100 is allocated outdoors, and each firefighter takes along a mobile device 300 and a plurality of routers 200. A first firefighter 510 and a second firefighter 520 sequentially allocate a first router 201, a second router 202, a third router 203 . . . and a sixth router 206 at each intersection and door of the room according to the traveling path. According to the above positioning method, the coordinator 100 positions the first router 201; the first router 201 positions the second router 202; the second router 202 positions the third router 203, the fifth router 205, and the fourth router 204; and the fifth router 205 positions the sixth router 206. After completing the positioning motion, each router 200 keeps positioning the mobile devices 300. The positioning results of the coordinator 100 and each router are broadcasted layer by layer, so as to substantially update the positioning tables stored in the coordinator 100, the routers 200, and the mobile devices 300, and the positioning tables are displayed by the display screens of the mobile devices 300. The data structure of the positioning tables is in a tree shape, which is convenient for recording and making calculations. Each router 200 and the mobile device 300 all have an environment sensing module for detecting an environment where the router 200 is located. For example, the fourth router 204 detects its environment as high temperature: 60 degrees; toxic gas: gas; ultraviolet: too strong; and conclusion: on fire. Such environment information is transmitted by the fourth router 204 to each router 200, the coordinator 100, and the mobile devices 300, and displayed on the display screens of the coordinator 100 and all the mobile devices 300. Meanwhile, warning signals are issued by warning modules of each router 200, the coordinator 100, and the mobile devices 300. For another example, when the mobile device 300 detects that a slope angle of the mobile device 300 itself exceeds the threshold value and lasts for an excessive long time, or detects that the physiological information of the first firefighter 510 is abnormal, for example, considering the first firefighter 510, fallen: over 60 seconds; pulse: low; toxic gas: gas; and conclusion: coma. Such physiological information is transmitted by the fourth router 204 to each router 200, the coordinator 100, and the mobile devices 300 layer by layer, and displayed on the display screens of the coordinator 100 and all the mobile devices 300. Meanwhile, warning signals are issued by warning modules of each router 200, the coordinator 100 and the mobile device 300, which facilitates the others to rescue the first firefighter 510.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A real-time positioning system, comprising:
a coordinator, comprising a first processor, a first omni-directional antenna, a first slope sensing module and a plurality of first directional antennas, the first slope sensing module detecting a first slope angle of the coordinator; and
a plurality of routers, each router comprising a second processor, a second omni-directional antenna, a second slope sensing module and a plurality of second directional antennas, the second slope sensing module detecting a second slope angle of the router,
wherein the coordinator carries out a signal interconnection with the second omni-directional antenna of each router of a first layer via the first omni-directional antenna thereof, the first processor calculates an initial distance between the coordinator and the router of the first layer according to strength of the signal interconnection; the coordinator carries out a signal interconnection with the second omni-directional antenna of the router of the first layer via the first directional antennas thereof, the first processor analyzes an initial direction toward the router of the first layer according to strength of the signal interconnection with each of the directional antennas and corrects the initial direction according to the first slope angle; the first processor positions the router of the first layer according to the correcting first initial direction and the initial distance; each router carries out a signal interconnection with a second omni-directional antenna of each router of a next layer via the second omni-directional antenna thereof, the second processor calculates a routing distance between the router and the router of the next layer according to strength of the signal interconnection; each router carries out a signal interconnection with the second omni-directional antenna of the router of the next layer via the second directional antennas thereof, the second processor analyzes a routing direction toward the router of the next layer according to strength of the signal interconnection with each of the second directional antennas and corrects the routing direction according to the second slope angle; the second processor positions the router of the next layer according to the correcting routing direction and the routing distance; once completing positioning motions, the coordinator and any of the routers broadcast positioning results layer by layer, so as to substantially update positioning tables of the coordinator and each of the routers synchronously.

2. The real-time positioning system as claimed in claim 1, wherein a union set of detecting angles of the first directional antennas is substantially the same as a detecting angle of the first omni-directional antenna, and a union set of detecting angles of the second directional antennas is substantially the same as a detecting angle of the second omni-directional antenna.

3. The real-time positioning system as claimed in claim 1, wherein when the second slope sensing module of the router detects that the second slope angle is changed, the second processor repositions each router of the next layer after the second slope angle stops changing.

4. The real-time positioning system as claimed in claim 3, wherein when the second omni-directional antenna of the router carries out the signal interconnection with the second omni-directional antenna of the router of the next layer, the second processor of the router recalculates the routing distance and the routing direction to position the router of the next layer.

5. The real-time positioning system as claimed in claim 4, wherein when the second omni-directional antenna of the router fails to carry out the signal interconnection with the second omni-directional antenna of each router of the next layer, the router carries out a signal interconnection with the second omni-directional antenna of each router of the next layer via the second directional antennas thereof, and repositions the router of the next layer.

6. The real-time positioning system as claimed in claim 5, wherein when the router fails to carry out the signal interconnection with the second omni-directional antenna of the router of the next layer via the second direction antennas thereof, the router carries out a signal interconnection with second directional antennas of the router of the next layer via the second directional antennas thereof, and repositions the router of the next layer.

7. The real-time positioning system as claimed in claim 5, wherein when the router carries out the signal interconnection with the second omni-directional antenna of the router of the next layer via the second directional antennas thereof, the second processor of the router recalculates the routing distance and the routing direction to position the router of the next layer.

8. The real-time positioning system as claimed in claim 1, wherein when the coordinator or each of the routers analyzes that the router of the next layer is displaced or disconnected, the coordinator or each of the routers carries out a signal interconnection with the router of the next layer again to reposition the router of the next layer.

9. The real-time positioning system as claimed in claim 8, wherein the first omni-directional antenna of the coordinator or the second omni-directional antenna of each of the routers carries out a signal interconnection with the second omni-directional antenna of the router of the next layer, so as to reposition the router of the next layer.

10. The real-time positioning system as claimed in claim 8, wherein when the first omni-directional antenna of the coordinator or the second omni-directional antenna of each of the routers fails to carry out the signal interconnection with the second omni-directional antenna of the router of the next layer, the coordinator carries out a signal interconnection with the second omni-directional antenna of the router of the next layer via the first directional antennas thereof, or each of the routers carries out a signal interconnection with the second omni-directional antenna of the router of the next layer via the second directional antennas thereof.

11. The real-time positioning system as claimed in claim 10, wherein when the first directional antennas of the coordinator or the second directional antennas of each of the routers fail to carry out the signal interconnection with the second omni-directional antenna of the router of the next layer, the first directional antennas of the coordinator or the second directional antennas of each of the routers carry out a signal interconnection with second directional antennas of the router of the next layer to reposition the router of the next layer.

12. The real-time positioning system as claimed in claim 1, further comprising at least one mobile device, carried by a user and comprising a third omni-directional antenna and a display screen, wherein each router detects a presence of the mobile device via the second omni-directional antenna thereof, and carries out a signal interconnection with the third omni-directional antenna of the detected mobile device; the second processor calculates a spacing between the router and the mobile device according to strength of the signal interconnection; then, the router carries out a signal interconnection with the third omni-directional antenna of the mobile device via the second directional antennas thereof, the second processor analyzes a direction of the mobile device according to strength of the signal interconnection with each of the second directional antennas and corrects the direction according to the second slope angle; the second processor positions the mobile device according to the spacing and the correcting direction; after finishing positioning the mobile device, any router broadcasts a positioning result to the coordinator and each of the routers layer by layer, so as to update positioning tables of the coordinator, each of the routers, and the mobile device; the display screen displays the positioning tables; and the display screen displays positioning schematic views of each of the routers, the coordinator, and other mobile devices.

13. The real-time positioning system as claimed in claim 1, wherein each of the routers detects each router of the next layer periodically, and when the router analyzes that the router of the next layer is disconnected for a long time, the router repositions routers of a further next layer.

14. The real-time positioning system as claimed in claim 1, wherein the coordinator detects each router of the first layer periodically, and when the coordinator analyzes that the router of the first layer is disconnected for a long time, the coordinator repositions routers of a further next layer to act as the router of the first layer.

15. A real-time positioning method, applied to an real-time positioning system, wherein the real-time positioning system comprises a coordinator and a plurality of routers, the real-time positioning method comprising:
  carrying out a signal interconnection with a second omni-directional antenna of each router of a first layer via a first omni-directional antenna of the coordinator;
  analyzing strength of the signal interconnection by a first processor of the coordinator, so as to calculate an initial distance between the coordinator and the router of the first layer;
  carrying out a signal interconnection with the second omni-directional antenna of the router of the first layer via a plurality of first directional antennas of the coordinator;
  analyzing strength of the signal interconnection with each of the first directional antennas by the first processor of the coordinator, so as to calculate an initial direction toward the router of the first layer;
  correcting the initial direction according to the first slope angle of the coordinator;
  positioning the router of the first layer according to the correcting initial distance and the initial direction;
  carrying out a signal interconnection with a second omni-directional antenna of each router of a next layer via the second omni-directional antenna of each of the routers;
  analyzing strength of the signal interconnection by a second processor of each of the routers, so as to calculate a routing distance between the router and the router of the next layer;
  carrying out a signal interconnection with the second omni-directional antenna of the router of the next layer via a plurality of second directional antennas of the router;
  analyzing strength of the signal interconnection with each of the second directional antennas of the router by the second processor of the router, so as to calculate a routing direction toward the router of the next layer;
  correcting the routing direction according to a second slope angle of the router;
  positioning the router of the next layer according to the correcting routing distance and the routing direction; and
  broadcasting positioning results layer by layer, so as to substantially update positioning tables of each of the routers and the coordinator synchronously.

16. The real-time positioning method as claimed in claim 15, wherein after finishing positioning the router of the first layer, the coordinator broadcasts positioning results layer by layer, so as to substantially update the positioning tables of each of the routers and the coordinator synchronously.

17. The real-time positioning method as claimed in claim 15, further comprising:

when the second slope angle of the router is changed and the second slope angle stops changing and maintains constant for a continuous time period, carrying out a signal interconnection with the second omni-directional antenna of each router of the next layer via the second omni-directional antenna of the router; and when the router successfully carries out the signal interconnection with the router of the next layer, repositioning the router of the next layer.

18. The real-time positioning method as claimed in claim 15, further comprising:

when the second slope angle of the router is changed and the second slope angle stops changing and maintains constant for a continuous time period, and when the second omni-directional antenna of the router fails to carry out the signal interconnection with the second omni-directional antenna of the router of the next layer, carrying out a signal interconnection with the second omni-directional antenna of the router of the next layer via the second directional antennas of the router; and when the second directional antennas of the router successfully carry out the signal interconnection with the second omni-directional antenna of the router of the next layer, repositioning the router of the next layer.

19. The real-time positioning method as claimed in claim 18, further comprising:

when the second directional antennas of the router fail to carry out the signal interconnection with the second omni-directional antenna of the router of the next layer, carrying out a signal interconnection with second directional antennas of the router of the next layer via the second directional antennas of the router; and repositioning the router of the next layer.

20. The real-time positioning method as claimed in claim 15, further comprising:

when the coordinator or each of the routers analyzes that the router of the next layer is displaced or disconnected, carrying out a signal interconnection with the second omni-directional antenna of the router of the next layer by the coordinator via the first omni-directional antenna thereof, or carrying out a signal interconnection with the second omni-directional antenna of the router of the next layer by each of the routers via the second omni-directional antenna thereof, and when the signal interconnection is successfully established, repositioning the router of the next layer.

21. The real-time positioning method as claimed in claim 20, further comprising:

when the first omni-directional antenna of the coordinator or the second omni-directional antenna of each of the routers fail to carry out the signal interconnection with the second omni-directional antenna of the router of the next layer, carrying out a signal interconnection with the second omni-directional antenna of the router of the next layer via the first directional antennas of the coordinator or the second directional antennas of each of the routers; and when the signal interconnection is successfully established, repositioning the router of the next layer.

22. The real-time positioning method as claimed in claim 21, further comprising:

when the first directional antennas of the coordinator or the second directional antennas of each of the routers fail to carry out the signal interconnection with the second omni-directional antenna of the router of the next layer, carrying out a signal interconnection with the second directional antennas of the router of the next layer via the first directional antennas of the coordinator or the second directional antennas of each of the routers; and when the signal interconnection is successfully established, repositioning the router of the next layer.

23. The real-time positioning method as claimed in claim 15, further comprising:

carrying out a signal interconnection with a third omni-directional antenna of at least one mobile device via the second omni-directional antenna of each of the routers;

analyzing strength of the signal interconnection by the second processor of each of the routers, so as to calculate a spacing between the router and the mobile device;

carrying out a signal interconnection with the third omni-directional antenna of the mobile device via the plurality of second directional antennas of the each of the routers;

analyzing strength of the signal interconnection with each of the second directional antennas by the second processor of the router, so as to calculate a direction of the mobile device;

correcting the direction according to a second slope angle of the router;

positioning the mobile device according to the spacing and the correcting direction; and broadcasting positioning results layer by layer, so as to substantially update positioning tables of each of the routers, the coordinator, and the mobile device synchronously.

24. The real-time positioning method as claimed in claim 15, further comprising:

detecting the router of the next layer periodically by the router; and repositioning each router of a further next layer, when the router analyzes that the router of the next layer is disconnected for a long time.

25. The real-time positioning method as claimed in claim 15, further comprising:

detecting the router of the first layer periodically by the coordinator; and repositioning each router of a next layer to act as the router of the first layer, when the coordinator analyzes that the router of the first layer is disconnected for a long time.

26. A device containing computer software loaded into an electronic device for executing a real-time positioning method, and the real-time positioning method comprises:

carrying out a signal interconnection with a second omni-directional antenna of a router of a first layer via a first omni-directional antenna of a coordinator;

analyzing strength of the signal interconnection by a first processor of the coordinator, so as to calculate an initial distance between the coordinator and the router of the first layer;

carrying out a signal interconnection with the second omni-directional antenna of the router of the first layer via a plurality of first directional antennas of the coordinator;

analyzing strength of the signal interconnection with each of the first directional antennas by the first processor of the coordinator, so as to calculate an initial direction toward the router of the first layer;

correcting the initial direction according to the first slope angle of the coordinator;

positioning the router of the first layer according to the initial distance and the initial direction;

carrying out a signal interconnection with a second omni-directional antenna of each router of a next layer via the second omni-directional antenna of each of the routers;

analyzing strength of the signal interconnection by a second processor of each of the routers, so as to calculate a routing distance between the router and the router of the next layer;

carrying out a signal interconnection with the second omni-directional antenna of the router of the next layer via a plurality of second directional antennas of the router;

analyzing strength of the signal interconnection with each of the second directional antennas by the second processor of the router, so as to calculate a routing direction toward the router of the next layer;

correcting the routing direction according to a second slope angle of the router;

positioning the router of the next layer according to the routing distance and the correcting routing direction; and broadcasting positioning results layer by layer, so as to substantially update positioning tables of each of the routers and the coordinator synchronously.

27. The device containing computer software as claimed in claim 26, wherein after finishing positioning the router of the first layer, the coordinator broadcasts positioning results layer by layer, so as to substantially update the positioning tables of each of the routers and the coordinator synchronously.

28. The device containing computer software as claimed in claim 26, further comprising:

when the second slope angle of the router is changed and the slope angle stops changing and maintains constant for a continuous time period, and when the second omni-directional antenna of the router carries out the signal interconnection with the second omni-directional antenna of the router of the next layer, repositioning the router of the next layer.

29. The device containing computer software as claimed in claim 26, further comprising:

when the second slope angle of the router is changed and the slope angle stops changing and maintains constant for a continuous time period, and when the second omni-directional antenna of the router fails to carry out the signal interconnection with the second omni-directional antenna of the router of the next layer, carrying out a signal interconnection with the second omni-directional antenna of the router of the next layer via the second directional antennas of the router; and when the second directional antennas of the router successfully carry out the signal interconnection with the second omni-directional antenna of the router of the next layer, repositioning the router of the next layer.

30. The device containing computer software as claimed in claim 29, further comprising:

when the second directional antennas of the router fail to carry out the signal interconnection with the second omni-directional antenna of the router of the next layer, carrying out a signal interconnection with second directional antennas of the router of the next layer via the second directional antennas of the router; and repositioning the router of the next layer.

31. The device containing computer software as claimed in claim 26, further comprising:

when the coordinator or each of the routers analyzes that the router of the next layer is displaced or disconnected, and when the first omni-directional antenna of the coordinator or the second omni-directional antenna of each of the routers carries out the signal interconnection with the second omni-directional antenna of the router of the next layer, repositioning the router of the next layer.

32. The device containing computer software as claimed in claim 31, further comprising:

when the first omni-directional antenna of the coordinator or the second omni-directional antenna of each of the routers fail to carry out the signal interconnection with the second omni-directional antenna of the router of the next layer, carrying out a signal interconnection with the second omni-directional antenna of the router of the next layer via the first direction antennas of the coordinator or the second direction antennas of each of the routers; and repositioning the router of the next layer.

33. The device containing computer software as claimed in claim 32, further comprising:

when the first directional antennas of the coordinator or the second directional antennas of each of the routers fail to carry out the signal interconnection with the second omni-directional antenna of the router of the next layer, carrying out a signal interconnection with second directional antennas of the router of the next layer via the first directional antennas of the coordinator or the second directional antennas of each of the routers; and repositioning the router of the next layer.

34. The device containing computer software as claimed in claim 26, further comprising:

carrying out a signal interconnection with a third omni-directional antenna of at least one mobile device via the second omni-directional antenna of each of the routers;

analyzing strength of the signal interconnection by the second processor of each of the routers, so as to calculate a spacing between the router and the mobile device;

carrying out a signal interconnection with the third omni-directional antenna of the mobile device via the plurality of second directional antennas of the router;

analyzing strength of the signal interconnection with each of the second directional antennas by the second processor of the router, so as to calculate a direction of the mobile device;

positioning the mobile device according to the spacing and the direction; and broadcasting positioning results layer by layer, so as to substantially update positioning tables of each of the routers, the coordinator, and the mobile device synchronously.

35. The device containing computer software as claimed in claim 26, further comprising:

detecting the router of the next layer periodically by the router; and repositioning a router of a further next layer, when the router analyzes that the router of the next layer is disconnected for a long time.

36. The device containing computer software as claimed in claim 26, further comprising:

detecting the router of the first layer periodically by the coordinator; and repositioning each router of a next layer to act as the router of the first layer, when the coordinator analyzes that the router of the first layer is disconnected for a long time.

* * * * *